United States Patent [19]

Jensen

[11] 4,326,216
[45] Apr. 20, 1982

[54] SYNCHRONOUS COLOR CONVERSION SYSTEM

[75] Inventor: Peter W. Jensen, Fremont, Calif.

[73] Assignee: Ampex Corporation, Redwood City, Calif.

[21] Appl. No.: 484,184

[22] Filed: Jun. 28, 1974

[51] Int. Cl.³ ............................................ H04N 9/491
[52] U.S. Cl. ...................................................... 358/8
[58] Field of Search .......................... 358/8, 21 R, 40; 178/6.6 TC, 69.5 CB; 360/36

[56] References Cited

U.S. PATENT DOCUMENTS

| | | | |
|---|---|---|---|
| 3,507,983 | 4/1970 | Leman | 358/8 X |
| 3,614,305 | 10/1971 | Hidaka et al. | 358/8 X |
| 3,619,491 | 11/1971 | Fujita | 358/8 X |
| 3,629,491 | 12/1971 | Dann et al. | 358/8 |
| 3,674,920 | 7/1972 | Faroudja | 178/6.6 TC X |
| 3,749,826 | 7/1973 | Arimura | 358/8 |
| 3,820,154 | 6/1974 | Faroudja et al. | 358/8 |

*Primary Examiner*—John C. Martin
*Attorney, Agent, or Firm*—Elizabeth E. Strnad; Joel D. Talcott

[57] ABSTRACT

Filters are coupled to receive an uncorrected composite color television signal, which signal has been subjected to recording and reproducing operations and processed to have incoherent luminance and chrominance components, with the chrominance component color corrected. The filters separate the composite signal into its luminance and chrominance components. The chrominance component is coupled to a decoder to prepare it for subsequent encoding relative to a chrominance subcarrier reference signal that is coherent with the luminance component. The chrominance subcarrier reference signal is provided by a generator that is frequency and phase adjusted relative to the luminance component. A following encoder receives the decoded chrominance component and reference signal. The encoder responsively operates to provide a newly encoded chrominance component stabilized to the reference signal. This causes the newly encoded chrominance component to be coherent with the luminance component. Both components are then combined and coupled to a conventional line-to-line time-base corrector for correcting any time-base errors that are present in the combined components.

11 Claims, 6 Drawing Figures

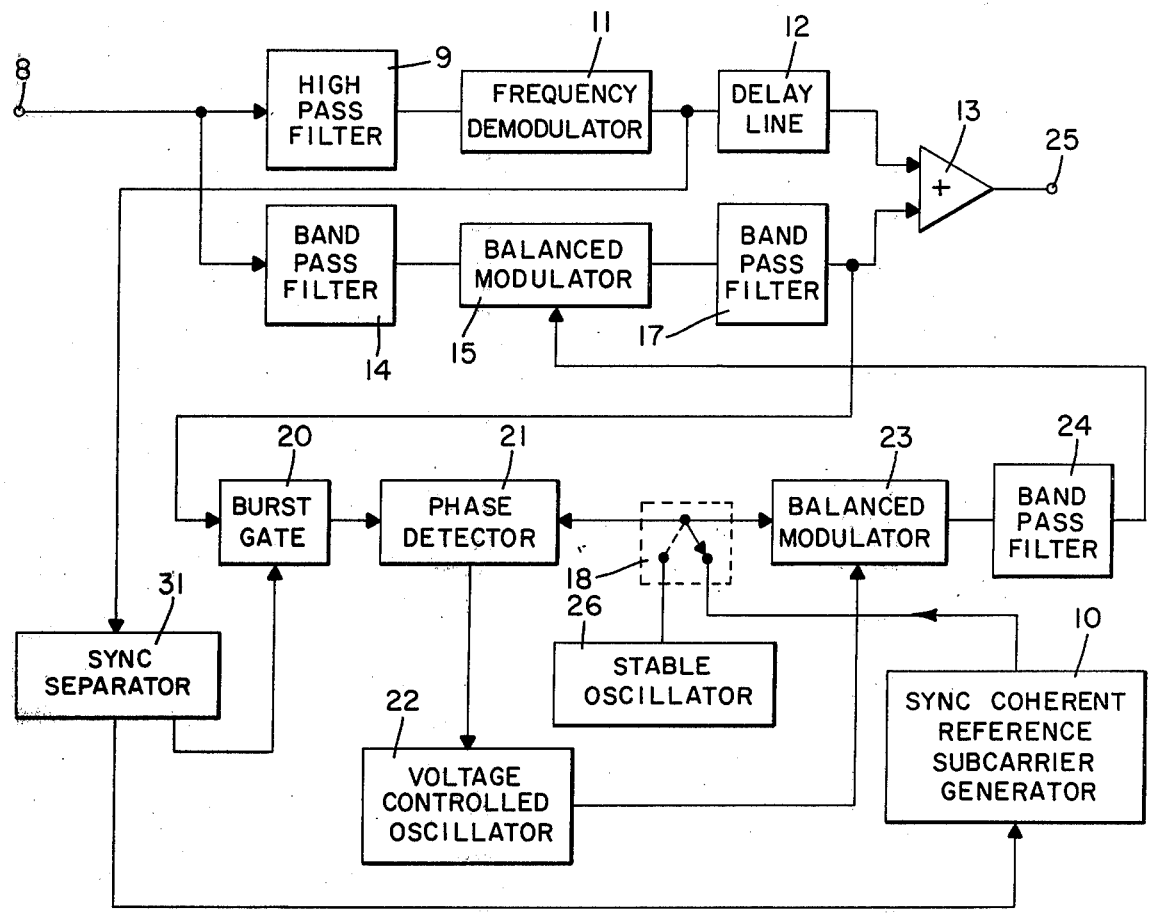
FIG_1
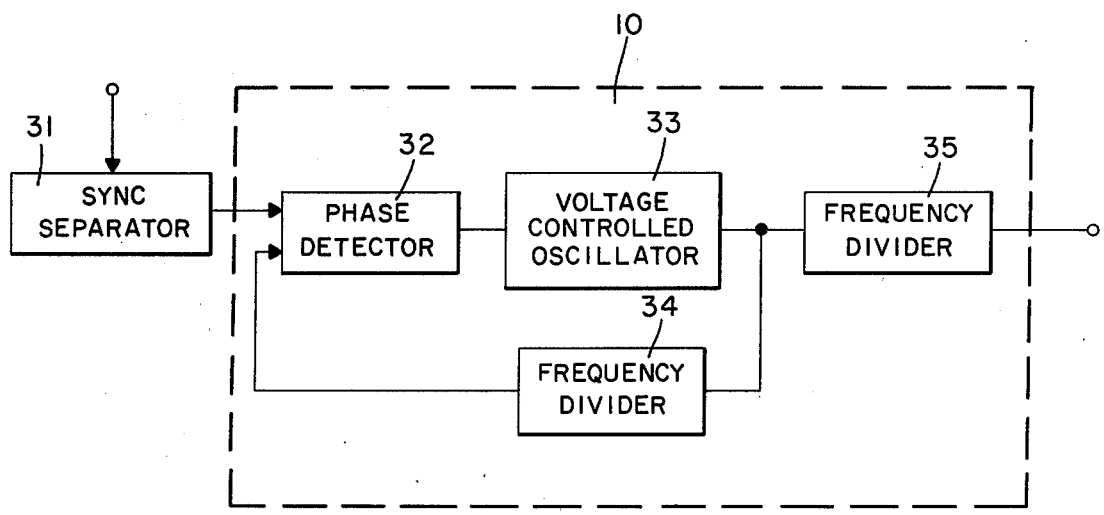
FIG_2

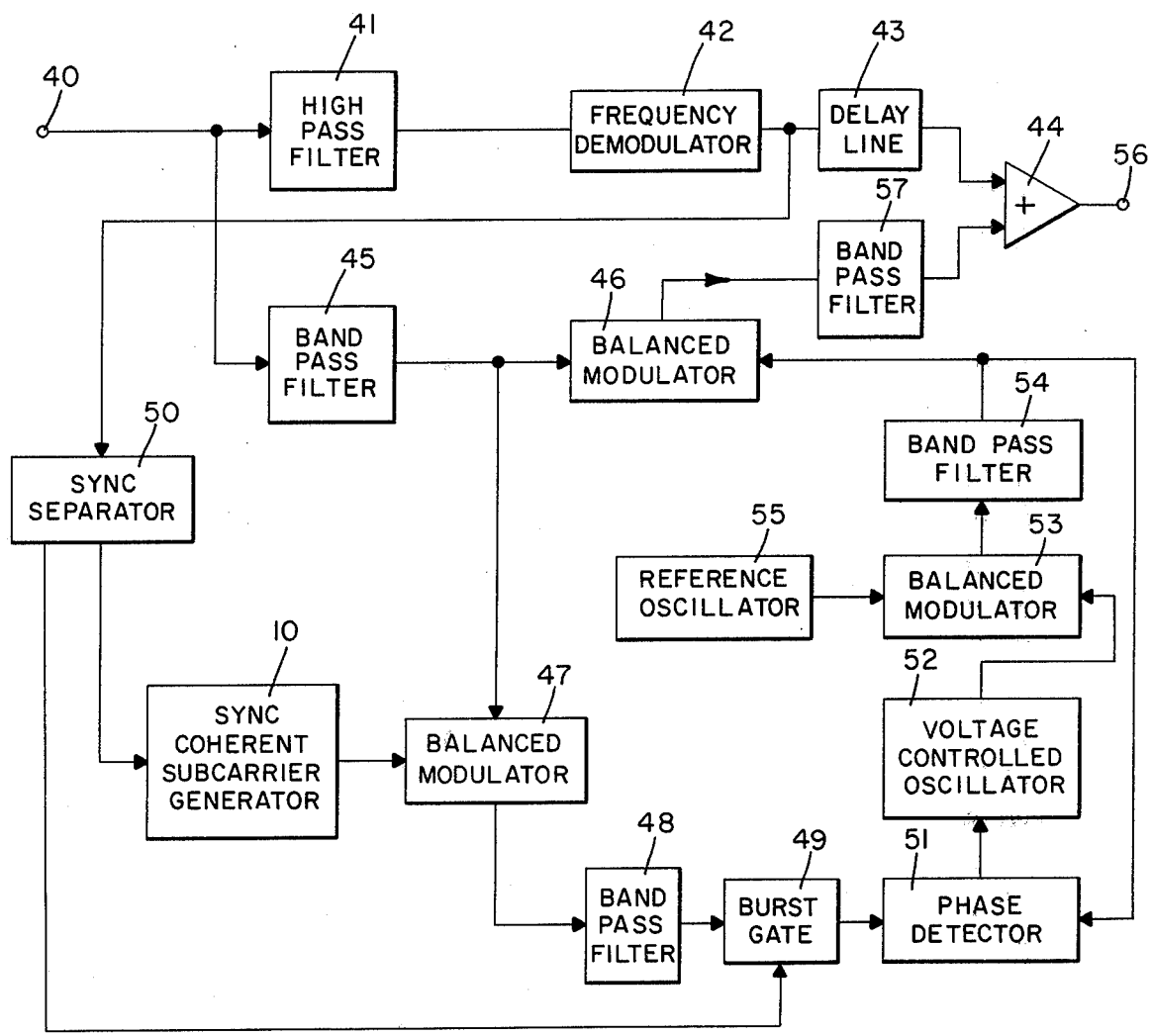
FIG_3
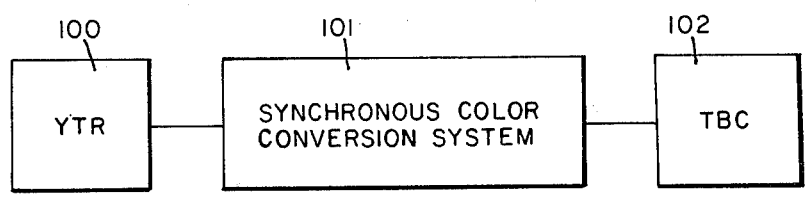
FIG_6

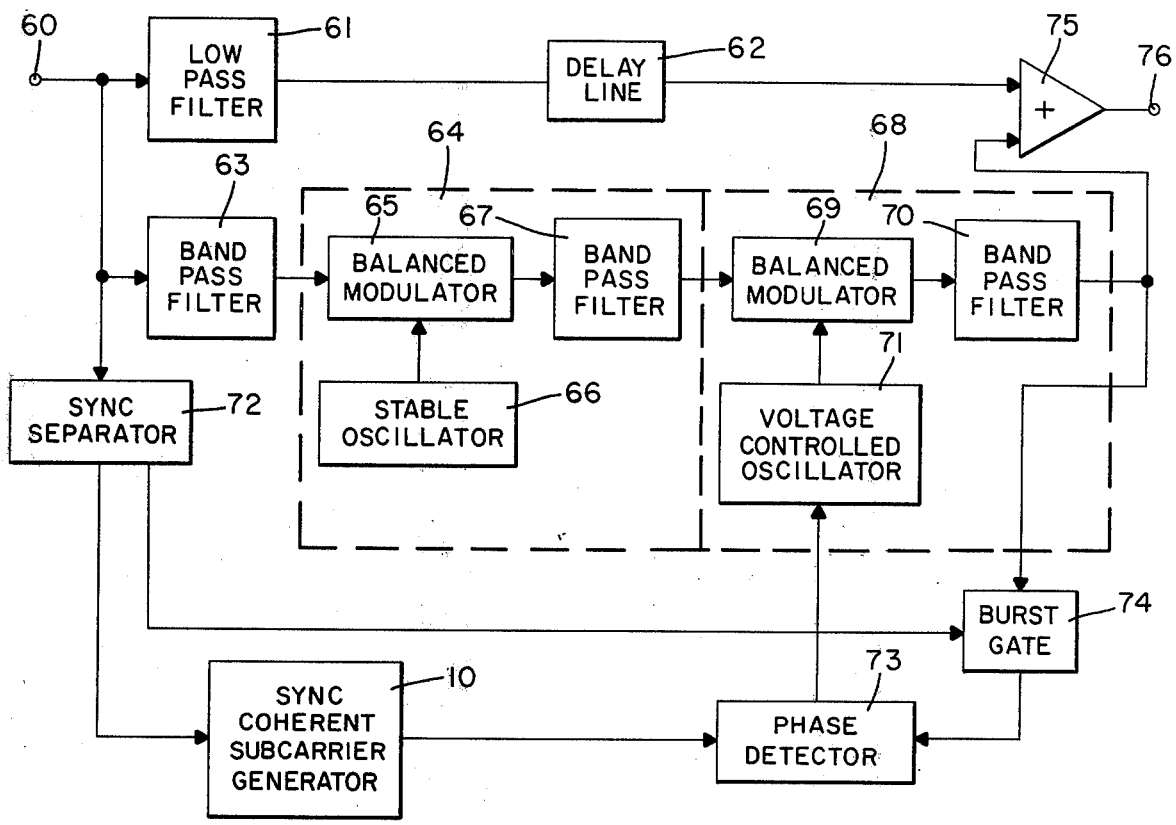
FIG_4
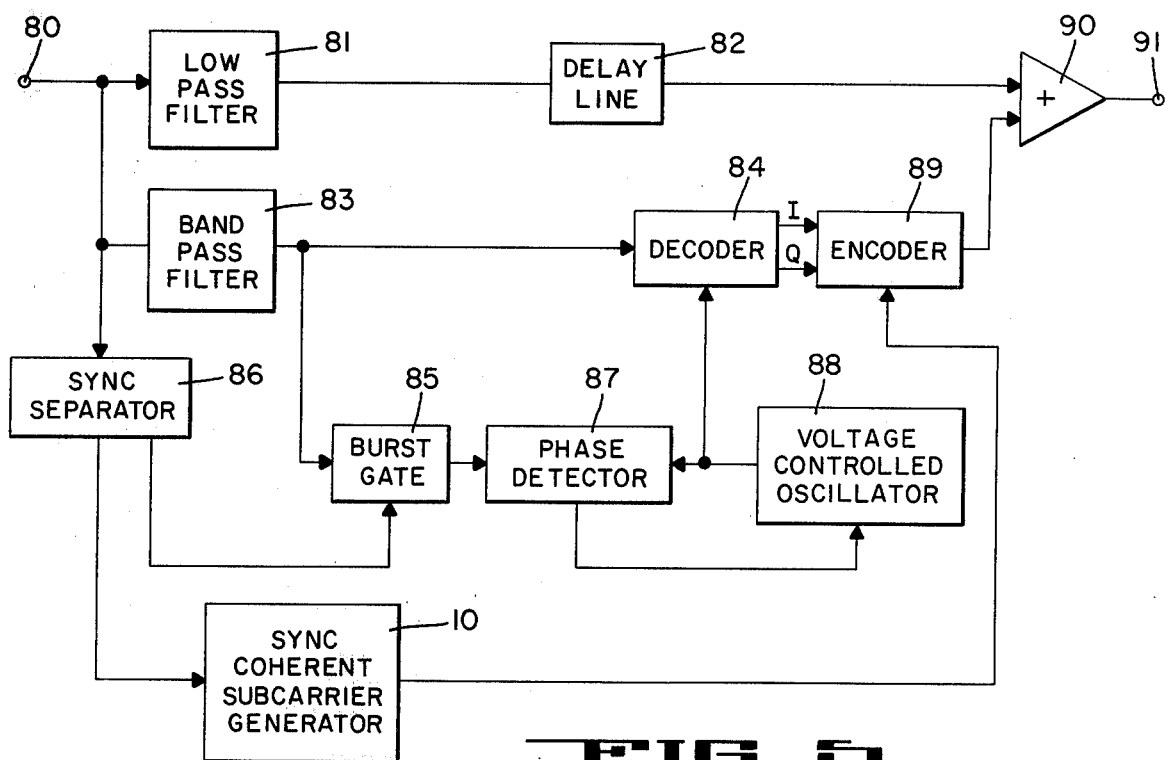
FIG_5

SYNCHRONOUS COLOR CONVERSION SYSTEM

BACKGROUND OF THE INVENTION

Cross-reference is made to a copending U.S. Patent Application Ser. No. 484,185 by Peter W. Jensen and Richard W. Palthe filed on June 28, 1974 concurrently with the present application and entitled "System For Processing A Composite Color Television Signal Obtained From A Recording Medium".

This invention concerns systems for eliminating timing errors from color television signals and particularly from color television signals having incoherent components.

Television signals are composite signals carrying monochrome and color information and synchronizing waveforms. The synchronizing waveforms repeat at known periodic intervals and include horizontal line pulses, vertical field pulses and color burst. The monochrome information is obtained in a luminance component and the color information in a chrominance component. When the synchronizing waveforms exhibit phase or frequency deviations with respect to a stable reference signal of the same type, the difference in timing between these signals is a so-called time-base error. If time-base errors exist, distortion of the television picture follows. Time-base errors are formed in systems for reproduction of composite television signals recorded on a storage medium, such as magnetic tape. These errors are inherent to the process of translating the signals onto and off the tape.

Many prior art devices have been developed which deal with the correction of time-base errors in reproduction of television signals.

A large group of prior art color television signal reproducing system phase-locks the chrominance signal to a stable reference subcarrier without fully correcting the timing errors of the composite color television signal. The output signal of these reproducing systems is stabilized as to the color hue and saturation. But the remaining timing errors inherent in the recording and subsequent reproducing process are unacceptable for some television signal applications.

As examples of the above-type prior art video recorders, the following systems may be mentioned: INSTAVIDEO video tape recorder (VTR) manufactured by AMPEX Corporation assignor of the present application, SONY VO-1600 VTR, SONY AV-8400 VTR. These systems employ the heterodyne signal processing technique, such as standardized by the Video Tape Recording Committee of the Electronic Industries Association of Japan (EIAJ).

For convenience, throughout the specification it will be referred to the above type prior art video tape recorders as "EIAJ type" recorders.

For better understanding of the invention, a brief description of an INSTAVIDEO recording and reproduce system, representing a prior art EIAJ-type video tape recorder/reproduce system follows.

In the recording part of an INSTAVIDEO VTR the transmitted composite color television signal is separated and formed into a frequency-modulated (fm) luminance component and frequency-transposed or converted chrominance component and then both components are combined and recorded.

In the reproduce part of the INSTAVIDEO VTR, the chrominance component, which contains the color information and the color burst synchronizing waveform, is separated from the luminance component by filters. Then, the original transmission frequency of both components is reconstituted for reproduction. At the frequency-reconstitution, a stable frequency chrominance subcarrier reference signal is utilized to correct the chrominance component in the following manner. First, the separated chrominance component is frequency-converted to a standard 3.58 MHz nominal carrier frequency. The color burst is extracted from the separated and frequency-converted chrominance component and it is phase-compared in a phase detector with the stable frequency reference signal from a crystal oscillator set at 3.58 MHz. The resulting phase error-voltage, which is representative of color errors, is employed to control a voltage-controlled variable frequency oscillator whose output frequency variations are responsive to the detected phase error. The output signal of the voltage-controlled oscillator is then frequency-converted to a higher frequency band. This high-band signal is in turn utilized for the above-mentioned frequency conversion of the separated chrominance component to the standard 3.58 MHz nominal carrier frequency. The detection of phase errors and concomitant phase adjustment of the voltage-controlled oscillator affect elimination of phase deviations of the color burst and, consequently, of the chrominance signal subcarrier with respect to the stable reference signal. This results in the frequency reconstitution of a color corrected chrominance component.

The fm luminance component of the composite television signal, which has been separated from the chrominance component in the reproduce part of the VTR, is first frequency demodulated to obtain its original transmission frequency band and then delayed to compensate the delay of the chrominance component due to the color-correction process. The uncorrected and delayed luminance component is then recombined with the color-corrected chrominance component for output.

As a result of the record and reproduce process employed in the INSTAVIDEO tape recorder/playback system, the luminance and chrominance components are permitted to become and remain incoherent with respect to each other. Thus, the recombined components often contain time-base errors inherent in the recording and subsequent reproduce process. These timing errors change arbitrarily during one field of the reproduced television picture in either direction.

Analogously to the INSTAVIDEO, other prior art EIAJ-type tape recorder systems exhibit similar time-base errors. Applications in which high quality reproduction of the television signal is required need time-base correction of both chrominance and luminance component. Commonly, such correction is done by conventional time-base correctors (TBC), which perform line-to-line correction of the reproduced signal.

U.S. Pat. No. 3,763,317, assigned to the assignor of the present patent application, describes a TBC representative of existing conventional systems performing time-base corrections of composite color television signals. Such time-base correctors perform line-to-line corrections of the recorded television signal by repositioning in time each horizontal line, consequently, each component of the television signal, such as the color burst, the video information, etc. The corrections are made relative to line reference sync pulses and a chrominance subcarrier reference signal developed by independent reference sources. This is achieved by a delay device including a plurality of delay lines have binary ordered delay periods which are selectively combined to form a composite delay for each successive cycle of the repetitive signal. The combination of delay lines is selected according to comparisons of the line sync pulse and color burst of the line being corrected with the corresponding reference signals provided by the reference sources so that each line of signal information is synchronized with a line reference sync pulse.

Such time-base corrections assume coherency of the signal's horizontal sync and color burst components. It would be desirable to interface an EIAJ type color video recorder with a conventional line-to-line time-base corrector of the above-described type to achieve an improved quality of the reproduced signal from the EIAJ type recorder.

However, the output signal from these recorders is not suitable for correction by the TBC system for the following reasons:

The variable delay device of the time-base corrector is designed to develop a time delay corresponding to phase deviations of the composite television signal's color burst component ranging from 0° to 360°. If the deviations of successive lines of the signal pass through 0° or 360°, the delay provided by the delay device is advanced or retarded one-full cycle of the subcarrier, depending on the direction in which the deviations of successive lines change. When the passage through 0° or 360° results from the lack of coherence between the luminance and chrominance components, it causes the video signal component passing through the delay device to jump a time corresponding to one cycle of the color burst in the corresponding direction. As a result, jitter on the television screen appears whenever the phase deviation passes through 0° or 360°.

From the above description it follows that the deficiencies of the prior-art EIAJ type color television recorders cannot be overcome by interfacing them with existing line-to-line time-base correctors in order to achieve high quality signal reproduction. Instead, when these two systems are interfaced, additional timing errors of the video signal component in the form of jitter are introduced.

SUMMARY OF THE INVENTION

Accordingly, it is an object of the present invention to process a composite color television signal obtained from a storage medium and having at least one component which is stabilized to a reference signal prior to line-to-line time-base correction of the composite television signal.

It is another object of the invention to process a reproduced composite color television signal so that said composite signal is adjusted to permit interfacing of said system with a conventional line-to-line time-base corrector.

Still another object of the present invention is to correct phase errors of a reproduced color television signal having a stabilized chrominance component which is incoherent with an uncorrected luminance component by phase-locking the stabilized chrominance component to the uncorrected luminance component.

Still a further object of the invention is to produce a stabilized chrominance component which is coherent with an uncorrected luminance component, which components form a composite color television signal.

Still another object of the invention is to process an output signal of an EIAJ-type video recorder to render it suitable for line-to-line time-base correction.

The above presented and further objects of the invention are accomplished by a system for processing a composite color television signal reproduced from a storage medium which reproduced signal has a stabilized chrominance component that is incoherent with its luminance component and vertical field, horizontal line, and color burst synchronizing components. In the system, means for separating the stabilized chrominance from the luminance component are utilized. A decoder receives the stabilized chrominance component and prepares it for subsequent encoding relative to a first reference signal that is coherent with the luminance component. To prepare the chrominance component for such subsequent encoding, the decoder frequency converts the chrominance component relative to a second reference signal having a known nominal frequency. The decoded chrominance component is coupled to a following encoder. The following encoder also receives the first reference signal and responsively operates to frequency convert the chrominance component relative to the first reference signal and, thereby, provide a newly encoded chrominance component stabilized to the reference signal whereby it is caused to be coherent with the luminance component.

Other objects, features and advantages of the present invention will become apparent from the following description of the preferred embodiments and accompanying drawings, wherein:

DESCRIPTION OF EMBODIMENTS

FIG. 1 is a block diagram of a reproduce system of a heterodyne video tape recorder in accordance with the invention claimed in the cross-referenced patent application.

FIG. 2 is a block diagram of a sync coherent subcarrier generator utilized in the present invention.

FIG. 3 is a block diagram of a reproduce system of a heterodyne video tape recorder arranged to provide coherent chrominance and luminance components directly from the signals obtained from the video tape in accordance with the invention claimed in the cross-referenced patent application.

FIG. 4 is a block diagram of a synchronous color conversion system, in accordance with the present invention.

FIG. 5 is a block diagram of another embodiment of a synchronous color conversion system, in accordance with the present invention.

FIG. 6 is a block diagram showing connection of the synchronous color conversion system in accordance with the present invention to a VTR and TBC, respectively.

FIG. 1 represents a reproduce system of a heterodyne VTR in accordance with the invention claimed in the cross-referenced patent application. A composite color television signal is received from the tape and applied via an input terminal 8 to a high pass filter 9 of 2.7 MHz in parallel with a band pass filter 14 of 767 kHz. The output signal of the high pass filter 9 is the separated frequency modulated luminance component. The luminance component is then decoded or demodulated by a frequency demodulator 11 to frequency convert it to its original transmission frequency and the demodulated signal is passed through a delay line 12, which provides a time delay for matching the delay of the chrominance component due to its processing. The output signal of the band pass filter 14 is the separated chrominance component, containing the color information and color burst. This chrominance component is decoded or frequency-converted (heterodyned) by a first frequency converter 15 to its nominal carrier frequency of 3.58 MHz at which it was transmitted prior to the recording. In accordance with the embodiments of FIGS. 1 and 3, the signal utilized for heterodyning is a control signal which renders the output signal of the converter 15 to be coherent with the above-mentioned luminance component, which process will be described later. The delayed luminance component at the output of the delay line 12 is then combined with the coherent chrominance component and the combined signal is thus suitable for time-base error correction in a conventional line-to-line time-base corrector (TBC).

Now the embodiment of FIG. 1 will be described in more detail.

The burst signal is extracted from the frequency converted chrominance signal by connecting the input of a burst gate 20 in the path of said chrominance component. Burst gate 20 is controlled by a sync separator 31 which has its input connected in the path of the demodulated luminance signal. Sync separator 31 extracts horizontal sync pulses from the demodulated luminance signal and causes the generation of burst gate pulses. These burst gate pulses in turn control gate 20 so that the latter is open only during the duration of each burst signal.

A sync coherent chrominance subcarrier generator 10 is provided, which produces an output signal of 3.58 MHz, coherent with the luminance component. Its block diagram is shown in FIG. 2 and will be described later.

A phase detector 21 measures the phase difference between the chrominance subcarrier at the output of filter 17, which signal is represented by the color burst, and the sync coherent subcarrier at the output of generator 10. Since the output signal of generator 10 contains the phase deviations of the luminance component, the error signal at the output of the phase detector 21 is responsive to these phase deviations. The output of the phase detector 21 is connected to an input of a variable-frequency oscillator, which is implemented by a voltage-controlled oscillator 22. The nominal frequency of this oscillator is set at 767 KHz and it is controlled by the above-described error signal. The output signal of the oscillator 22 is fed into an input of a second frequency converter, which is implemented by a balanced modulator 23. The other input of modulator 23 is connected to the output of generator 10. Balanced modulator 23 converts the output frequency of oscillator 22 to a higher frequency band of 4.34 MHz. The sum frequency of 3.58 MHz and 767 kHz at the output of the balanced modulator 23 is filtered by a band-pass filter 24 of 4.347 MHz and applied to one input of the balanced modulator 15. The signal at the output of the second balanced modulator 23 serves as a control signal utilized by the first balanced modulator 15 for the subsequent frequency conversion of the chrominance component. This control signal is derived from the coherent subcarrier signal, in the above disclosed manner by which a chrominance subcarrier at the output of the modulator 15 is obtained, which is coherent with the luminance component.

The other input of modulator 15 is connected to the output of the previously mentioned band-pass filter 14.

The difference frequency at the output of the balanced modulator 15 is passed through a band-pass filter 17 of 3.58 MHz. The coherent chrominance and luminance components are then combined in a signal adder 13 and fed into an output terminal 25. The resulting output signal is suitable to be fed into a conventional line-to-line time-base corrector.

As an alternative to the preferred embodiment of the invention, shown in FIG. 1, the frequency conversion of the separated chrominance component to 3.58 MHz nominal carrier frequency could be performed in one step, utilizing only one balanced modulator 15 and omitting modulator 23. (This alternative embodiment is not shown). This could be achieved, if the oscillator 22 would have a nominal frequency of 4.347 MHz. It is obvious that a signal of this frequency could be used as a control signal fed directly into the first balanced modulator 15.

Now the generator 10 for producing a sync coherent subcarrier signal of 3.58 MHz shown in FIG. 2 will be described. The horizontal line synchronizing pulses, which are coherent with the luminance component, are separated from the demodulated luminance signal received at the output of demodulator 11 by the sync separator circuit 31, as shown in FIG. 1. The separated horizontal pulses having a nominal frequency of 15.734 kHz are fed from the output of the separator 31 into one input of a phase detector 32. A variable-frequency oscillator, which is implemented by a voltage controlled oscillator 33, having a nominal frequency of 7.16 MHz is connected to the output of the phase detector 32. The output of the oscillator 33 is fed into an other input of the phase detector 32. Thus, the phase detector 32 detects the phase deviations of the horizontal sync pulses, received from the tape, with respect to the output signal of the voltage-controlled oscillator 33. The frequency of the oscillator 33 is in turn controlled by the output of the phase detector 32. Consequently, the output signal frequency of the oscillator varies with the detected phase-variations of the horizontal sync pulses. The output frequency of 7.16 MHz of the oscillator is adjusted by a frequency divider 34, to be equal to the horizontal sync pulse frequency of 15.734 kHz. Thus, the divider 34 performs a division of the oscillator output frequency by 455. Another frequency divider 35 is connected also to the output of the oscillator 33. Frequency divider 35 divides the output signal frequency of the oscillator 33 by 2, to adjust it to the nominal frequency of 3.58 MHz of the color burst signal. The output signal of frequency divider 35 is a sync coherent signal of 3.58 MHz and thus suitable for phase-detection in the phase-detector 21 with respect to the phase of the color burst signal entering in the phase detector 21 via its other input as shown in FIG. 1.

From the above-description of the subcarrier generator 10 shown in FIG. 2 follows, that the generator 10 produces an output signal of 3.58 MHz which is phase-locked to, and thus coherent with the luminance signal component.

In the previous description of a prior-art INSTAVIDEO reproduce system it was mentioned that a stable crystal reference oscillator of 3.58 MHz is utilized to produce a reference signal which is then phase-compared with the color burst and the resulting phase-deviation is utilized to correct the color component. Such a stable crystal oscillator 26 is shown in FIG. 1. A switch 18 is provided. To its pole, phase detector 21 and balanced modulator 23 are connected permanently, while by its contacts the sync coherent subcarrier generator 10 is connected alternately with the stable crystal generator 26, depending on the instant position of switch 18. This provision makes possible to interconnect generator 10 into a prior art reproduce system and to select the desired type of generator, depending on whether the reproduced signal will be further processed by a line-to-line TBC.

FIG. 3 shows another preferred embodiment of the invention claimed in the cross-referenced patent application. It is a reproduce system in which a composite color television signal is received from the tape at an input terminal 40 and is thereafter separated into chrominance and luminance components. The luminance component passes through a high-pass filter 41 and is subsequently decoded or demodulated by a frequency demodulator 42. To the output of the demodulator a delay line 43 is coupled to match the delay of the chrominance component due to its processing. The output of the delay line 43 is fed into one input of a signal adder 44.

A band-pass filter 45 separates the chrominance component from the luminance. The separated chrominance component is frequency-converted in a balanced modulator 46 to a higher frequency band, corresponding to the conventional transmission frequency of the chrominance signal set at 3.58 MHz. The second input signal of the modulator 46 utilized for the frequency conversion of a control signal that causes the output signal of the balanced modulator 46 to be coherent with the line synchronizing pulses, as will be explained later.

The circuit for producing this control signal will now be described.

The separated chrominance signal at the output of the band-pass filter 45 is frequency converted by a first balanced modulator 47 to a higher frequency band at a carrier frequency of 4.27 MHz, which is the sum of the off-tape chrominance signal nominal carrier frequency 688 kHz and of a nominal 3.58 MHz signal. The signal of 3.58 MHz is supplied by a sync coherent subcarrier generator 10 which is of the same type as previously disclosed and shown in FIG. 2. It has been previously described in detail, that the output of the generator 10 is a subcarrier signal coherent with the luminance component of the composite television signal received from the tape. The output signal of the modulator 47 passes through a 4.27 MHz band pass filter 48. Thus the output signal of the filter 48 is the sum of the unstable 688 kHz chrominance carrier and of the sync coherent 3.58 MHz signal supplied by the generator 10. The output of the filter 48 is coupled to the input of a burst gate 49. The burst gate 49 is controlled by the output of a sync separator 50. The burst gate 49 extracts the burst signal from the chrominance signal at the output of band pass filter 48 only during the burst intervals. A phase detector 51 is employed to phase-compare the output signal of the burst gate 49 with the above-mentioned control signal at the input of modulator 46. This control signal is supplied by a color correction circuit comprising elements 51, 52, 53, 54 and 55. The output signal of this color correction circuit is frequency and phase-related to the burst signal at the output of the band-pass filter 48 and has no significant phase variations with respect to said burst signal. The instabilities of the two input signals of the balanced modulator 46 are of complimentary character and are canceled in the subsequent conversion process. The resulting output signal of modulator 46 is a sync coherent chrominance signal having a nominal carrier frequency of 3.58 MHz.

Now the circuit for color correction of the chrominance component will be described. A voltage-controlled oscillator 52 is coupled to the output of phase detector 51. The nominal frequency of the oscillator is 688 kHz. The output of oscillator 52 is coupled to one input of a second balanced modulator 53. To the other input of modulator 53 the output of a 3.58 MHz reference crystal oscillator 55 is coupled. The sum-frequency 4.27 MHz of the output signal of the balanced modulator 53 is passed through a band-pass filter 54 and the output signal of filter 54 is fed back to the other input of the phase-detector 51. The phase detector 51 detects the phase differences between the filtered burst signal at the output of the burst gate 49 and control signal at the output of filter 54. The gain from the feedback loop comprising the phase comparator 51, oscillators 52 and 55, modulator 53 and filter 54 is such that the output signal of the filter 54 has no significant phase variations with respect to the burst signal at the output of burst gate 49. The output of filter 54 is coupled to the other input of the balanced modulator 46, to the first input of which the off-tape uncorrected chrominance component from the band-pass filter 45 is fed. The difference frequency of both input signals of this balanced modulator 46, which is the nominal 3.58 MHz carrier frequency, is fed through a band-pass filter 57 to the other input of the signal adder 44. The coherent chrominance and luminance signal components are combined in the signal adder 44. The output signal of the signal adder at terminal 56 is thus made suitable for processing by a line-to-line time-base corrector. Thus, the signal reproduce system of the preferred embodiment of the invention shown in FIG. 3 may be readily interfaced with a conventional TBC, to eliminate the time-base errors of both the chrominance and luminance signal components inherent to the recording and subsequent reproducing process.

In an alternative embodiment of the system shown in FIG. 3, instead of the stable reference oscillator 55 a sync coherent subcarrier generator 10 may be employed. This modification of the system is not necessary to achieve the phase-locking of the chrominance component to the luminance, but may be of advantage to the system. Instead of using two different oscillator circuits 10 and 55, just one circuit 10 providing two outputs may be sufficient for the entire system. Another advantage of this modification is that the above-disclosed color-correction feedback circuit would operate with considerably smaller error signals, if both rference signal generators 10 and 55 would be implemented by one single generator with two outputs.

Analogously to the previously described embodiment shown in FIG. 1, a switch (not shown) similar to switch 18 may be utilized in the above-described system of FIG. 3. Such a switch would selectively and alternatively interconnect generator 10 or a stable crystal oscillator such as oscillator 55, respectively, with the reproduce system depending on whether a further line-to-line time-base error correction is required.

The embodiments described hereinabove with reference to FIGS. 1–3 are representative of implementations of the invention subject of my above-identified cross-referenced application. Embodiments of the invention subject of this application are shown in FIGS. 4 and 5, respectively. The generator shown in FIG. 2 is utilized in the respective embodiments of the present invention as well as that of the cross-referenced application.

The embodiment of the present invention shown in FIG. 4 will now be described in detail.

In this system for processing a composite television signal reproduced from a storage medium, an output signal from an EIAJ-type video tape recorder is received at an input terminal 60. In the previous description of the prior art EIAJ-type video tape recorders, it has been explained and emphasized that the output signal of an EIAJ-type VTR is normally color corrected with respect to an independent stable reference signal, but the time-base errors of the chrominance and luminance component stay uncorrected. As a result, chrominance and luminance components at the output of an EIAJ-type video recorder are incoherent and unsuitable for correction in conventional time-base correctors.

The signal received at the input terminal 60 consists of an uncorrected composite color television signal, including a frequency-demodulated luminance component and a frequency-converted chrominance component, the latter component having a nominal carrier frequency of 3.58 MHz and containing the color information and color-burst. The luminance component is separated from the chrominance component by a low-pass filter 61 of 2.2 MHz which is followed by a delay line 62. The chrominance component, which is incoherent with the luminance component, is passed through a band-pass filter 63 of 3.58 MHz, to eliminate the low-frequency components. The separated chrominance signal is then decoded or frequency-converted in a first frequency-converter 64 to a lower carrier frequency to prepare it for subsequent encoding relative to a reference that is coherent with the luminance component. The first frequency converter 64 comprises a first balanced modulator 65 to one input of which a stable crystal oscillator 66 is coupled to provide thereto a signal at a known nominal frequency of 4.347 MHz. To the other input of the first balanced modulator the output of the first band-pass filter 63 is coupled. The difference frequency at the output of the first balanced modulator 65, which has a nominal carrier frequency of 767 kHz, is passed through a second band-pass filter 67, which eliminates the unwanted frequency components. The output signal of the first frequency converter 64 which is at the same time the output signal of the second band-pass filter 67 is then fed into an encoder or second frequency-converter 68, which converts the chrominance signal back to its nominal carrier frequency of 3.58 MHz. Analogously with the first frequency converter, the second frequency converter 68 comprises a second balanced modulator 69 followed by a third band-pass filter 70.

A voltage-controlled oscillator 71 is coupled to one input of the second balanced modulator 69, and supplies a reference control signal derived from the coherent subcarrier signal. The generation of this control signal will be described now.

Analogously to the previously described embodiments, a sync coherent subcarrier generator 10, similar to that shown in FIG. 2, is utilized. The input signal of this generator 10 is the output signal of a sync separator 72, which extracts the horizontal line sync pulses from the incoming composite signal. The output signal of said sync coherent generator 10 is fed into one input of a phase comparator 73. The color burst signal is extracted from the chrominance component at the output of the second frequency converter 68 by a burst gate 74. The burst gate 74 is controlled by burst gate pulses derived by the sync separator 72. The extracted burst signal at the output of the burst gate 74 is fed into the other input of the phase-comparator 73. The phase detector 73 compares the phase of the reproduced color burst with the phase of the output signal from generator 10, and develops an error signal responsive to the resulting phase deviation. The error signal at the output of the phase detector 73 is utilized to control the frequency of the voltage-controlled oscillator 71. As it has been above mentioned, the output of the voltage-controlled oscillator is coupled to one input of the second balanced modulator 69. The nominal frequency of the voltage-controlled oscillator is set at 4.34 MHz, which frequency deviates corresponding to the deviations of the error voltage at the output of the phase-detector 73. The output signal from the oscillator 71 is the above-mentioned control signal. It is mixed with the frequency-converted chrominance component in the second balanced modulator 69 and the resulting difference-frequency signal at the output of the second balanced modulator 69, which has a nominal carrier frequency of 3.58 MHz, is filtered in the band-pass filter 70, as previously described. The output signal of the second balanced modulator is thus a frequency-reconverted chrominance component, which has been made coherent with the horizontal sync pulses and consequently also with the luminance component.

The delayed luminance component and the color-corrected and coherent chrominance component are combined in a signal adder 75 and fed into an output terminal 76.

The output terminal 76 may be interconnected with a conventional time-base corrector, performing line-to-line corrections, and thus an improved reproduction of a recorded color television signal may be achieved. FIG. 6 shows the input of a synchronous color correction system 101 in accordance with the present invention, connected to reproduce signal output of a conventional VTR 100, which supplies a reproduced color television signal having incoherent luminance and chrominance components. The output of the system 101 is connected to an uncorrected signal input of a conventional TBC 102 for providing line-to-line time base correction of television signals obtained from system 101. It should be noted with respect to the above-described embodiment of the invention shown in FIG. 4 that the specific frequencies related to the block diagram have been chosen only as examples to facilitate the understanding of the invention. Other suitable frequencies may be selected as well for proper operation without departing from the scope of the invention.

Thus, known nominal frequency of the nominal stable oscillator 66 has to be greater or less than the color subcarrier frequency by an amount which will produce a suitable sum or difference frequency at the output of the balanced modulator 65. This oscillator frequency must be high enough to accomodate the color sidebands without fold-over and should be easy to separate from the other components. Consequently, the center frequency of the band-pass filter 67 is chosen to be equal to the desired sum or difference frequency component of the modulator 65 output and the bandwidth of the filter should be sufficient to pass the color sidebands. The frequency of the voltage controlled oscillator 71 is chosen so that either the sum or the difference nominal frequency component in the output signal of the balanced modulator 69 is the same as the original nominal subcarrier frequency. The desired output signal component is then selected by the band-pass filter 70 with adequate bandwidth to pass the color sidebands.

Finally, FIG. 5 shows a preferred embodiment of the invention, which is still different in details from that previously described and shown in FIG. 4. The embodiment shown in FIG. 5 receives an output signal from an EIAJ-type video recorder, at an input terminal 80. The luminance component of the received signal is separated from the chrominance component by a low pass filter 81. The filter 81 is followed by a delay-line 82 to match the delay of the chrominance component resulting from its processing.

A band-pass filter 83 of 3.58 MHz separates the chrominance component from the luminance.

In the embodiment of FIG. 5, the adjustment of the chrominance component to render it coherent with the luminance component is performed in two basic steps which steps may be designated as frequency-decomposition decoding of the chrominance signal to remove the color information from the high frequency carrier signal, followed by its subsequent frequency-reconstitution encoding by placing the color information on a carrier signal. In the embodiment of FIG. 4, frequency-converting the chrominance component to a lower carrier frequency followed by a subsequent reconverting it to its original carrier frequency is employed.

While both embodiments involve frequency conversion of the chrominance component, in the embodiment of FIG. 5, the steps are performed in a different way. The frequency-decomposition of the chrominance component is done by a color decoder 84, which decodes the component into its color signal components I and Q or color difference signals B-Y and R-Y. The color decoding is done by demodulation of the chrominance component, which is a process well known in the art. Color decoding of the chrominance component is done with respect to the extracted color burst signal, which has a known nominal frequency. The extracted color burst is made continuous in the following manner. The color burst signal is extracted from the separated chrominance signal at the output of the filter 83 by a burst gate 85. Burst gate 85 is controlled by a sync separator 86 in a similar way as previously described with reference to other embodiments. The output signal of the burst gate 85 is fed into one input of a phase detector 87. A voltage-controlled crystal oscillator 88 is coupled to the other input of the phase-detector 87. The nominal frequency of the oscillator 88 is 3.58 MHz. The phase of the incoming color burst signal from the output signal of said EIAJ-type video recorder is compared to the phase of the output signal of oscillator 88 in the phase comparator 87 and the resulting error voltage is fed back to the input of the voltage-controlled oscillator 88. The output signal of the oscillator 88 is thus voltage-controlled to eliminate the phase errors of the incoming burst signal with respect to the reference signal from the oscillator 88. The output signal of the oscillator 88 thus serves as a reference signal for the color decoding.

In the step of the color signal reconstitution, the I and Q or B-Y and R-Y components, respectively are encoded on a sync coherent subcarrier. The color signal components I and Q or B-Y and R-Y at the output of the color decoder 84 are fed into the input of a color encoder 89. For color encoding, the output signal of the sync coherent subcarrier generator 10 is utilized as a reference subcarrier, onto which the components I and Q or B-Y and R-Y are encoded. The encoding is performed by quadrature modulation of the I and Q or B-Y and R-Y components respectively using said reference subcarrier, which is coherent with the luminance component, as has been previously described.

Thus, the output signal from the color encoder 89 is a modulated chrominance component having a nominal carrier frequency of 3.58 MHz which is coherent with the luminance component. This chrominance component is combined with the delayed luminance component in a signal adder 90 and fed into an output terminal 91. The output signal at the terminal 91 is thus made suitable for line-to-line time-base correction in conventional time-base correctors.

By interfacing the input of the synchronous color conversion system of the preferred embodiments of the invention above-described and shown as in FIGS. 4 and 5 respectively, with an EIAJ-type video tape recorder, and by interfacing the output of that system with a conventional TBC, as shown in FIG. 6, an improved television signal is obtained, which complies with the broadcast standards.

The above-described preferred embodiments of the invention are designed for use in the NTSC color television system. However, the invention may be adapted for use in other television systems as well.

While several embodiments of the invention have been illustrated and described, it is to be understood that these were given merely for the purpose of explanation. It will be apparent to those skilled in the art that many modifications and variations of the invention may be effected without departing from the scope of the novel concepts of the invention as set forth in the appended claims.

What is claimed is:

1. A system for processing a composite color television signal having vertical field, horizontal line, and color burst synchronizing components and incoherent luminance and chrominance components, said luminance component being coherent with said horizontal line synchronizing component, said chrominance component being coherent with said color burst synchronizing component, and said components being at nominal transmission frequency bands, comprising:
    (a) means coupled to receive said composite signal and separate said chrominance and luminance components;
    (b) means responsive to said horizontal line synchronizing component to generate a first reference signal coherent with said luminance component;
    (c) means for generating a second reference signal at a known nominal frequency;
    (d) means responsive to the color burst synchronizing component and one of said first and second reference signals for providing a phase corrected reference signal, the other of said first and second reference signals being a phase uncorrected reference signal;
    (e) decoding means coupled to receive said separated chrominance component for frequency decomposing it in response to and with respect to the phase of a decoding reference signal;
    (f) encoding means coupled to receive said frequency decomposed chrominance component for reconstituting the chrominance component at said nominal transmission frequency in response to and with respect to the phase of an encoding reference signal; and (g) one of said phase corrected and said phase uncorrected reference signals coupled to the decoding means as the decoding reference signal and the other signal coupled to the encoding means as the encoding reference signal.

2. A system according to claim 1 wherein:
(a) said decoding means comprises a first frequency converter coupled to receive said separated chrominance component for converting it from its nominal transmission frequency band to a different frequency band;
(b) said encoding means comprises a second frequency converter coupled to receive said separated and converted chrominance component and said encoding reference signal for converting said different frequency band chrominance component to the nominal transmission frequency band of said chrominance component; and
(c) said means for providing a phase corrected reference signal comprises:
 a burst gate coupled to said second frequency converter for extracting said color burst component from its output;
 a phase detector coupled to said burst gate for detecting the phase of said extracted burst component with respect to the phase of said first reference signal, said phase detector produces a corresponding error voltage; and
 a variable frequency oscillator means coupled to receive said error voltage for providing said phase corrected reference signal with its frequency and phase adjusted according to said error signal to be coherent with said first reference signal, said phase corrected reference signal coupled to a control input of said second frequency converter as the encoding reference signal.

3. A system according to claim 2, wherein said means for generating said first reference signal coherent with said luminance component comprises:
(a) means for separating said horizontal line synchronizing component from said composite television signal;
(b) a second variable frequency oscillator means providing said first reference signal; and
(c) a second phase detector for detecting the phase of said horizontal line synchronizing component with respect to the first reference signal of said second variable frequency oscillator means and producing a corresponding second error signal to control the frequency and phase of the first reference signal provided by said second variable frequency oscillator means.

4. A system according to claim 1 wherein:
(a) said decoding means comprise a color signal decoder coupled to receive the separated chrominance component and responsive to the second reference signal as the decoding reference signal for decoding said separated chrominance component into its color components; and
(b) said means for providing a phase corrected reference signal comprises:
 a burst gate for extracting said burst synchronizing component from said separated chrominance component at the input of said decoding means; and
 a phase detector for comparing the phase of said extracted burst synchronizing component to that of said second reference signal and producing a corresponding error signal coupled to the means for generating the second reference signal to control the frequency and phase of the second reference signal to provide thereby a phase corrected second reference signal.

5. A system according to claim 4, wherein said encoding means comprises a color signal encoder for encoding said color components by quadrature modulation with respect to said coherent first reference signal.

6. A system according to claim 1 further comprising a color video reproduce system providing said composite color television signal coupled to an input of said separating means.

7. A system according to claim 1 further comprising means coupled to receive and combine the reconstituted chrominance component and separated luminance component; and a time-base corrector for performing line-to-line correction of a reproduced color television signal having coherent components coupled to receive the combined components.

8. A system according to claim 7 further comprising a color video reproduce system providing said composite color television signal coupled to an input of said separating means.

9. An apparatus for processing a composite color television signal reproduced by a video reproduce system, said signal having incoherent chrominance and luminance components, and vertical field, horizontal line and color burst synchronizing components, said luminance component being coherent with said horizontal line synchronizing component and said chrominance component being coherent with said color burst synchronizing component, said components being at nominal transmission frequency bands, said apparatus comprising in combination:
(a) means for receiving said composite signal from said video reproduce system;
(b) means for separating said received signal into a low frequency band luminance component and into a high frequency band chrominance component, said separated high frequency band chrominance component containing said color burst component;
(c) means for generating a reference signal of a known frequency;
(d) means for frequency-converting said separated high frequency chrominance component into a different frequency band in response to the reference signal of a known frequency;
(e) means for generating a reference subcarrier signal coherent with said luminance component;
(f) means responsive to a control signal derived from said reference subcarrier signal for frequency-reconverting said frequency-converted chrominance component to its nominal transmission frequency band;
(g) means coupled to said frequency-reconverter means for extracting said burst component from said frequency-reconverted chrominance component;
(h) means for phase-comparing said extracted burst component with said reference subcarrier signal to provide said control signal; and
(i) means for combining said separated luminance component and said frequency-reconverted chrominance component into a composite color television signal.

10. An apparatus for processing a composite color television signal reproduced by a video reproduce system, said signal having incoherent chrominance and luminance components, and vertical field, horizontal line and color burst synchronizing components, said luminance component being coherent with said horizontal line synchronizing component and said chrominance component being coherent with said color burst synchronizing component, said components being at nominal transmission frequency bands, said apparatus comprising in combination:

(a) means for receiving said composite signal from said video reproduce system;
(b) means for separating said received signal into a low frequency band luminance component and into a high frequency band chrominance component, said separated high frequency band chrominance component containing said color burst synchronizing component;
(c) means for extracting said color burst synchronizing component from said separated high frequency band chrominance component;
(d) means for generating a reference signal;
(e) means for phase-comparing said extracted color burst synchronizing component with said reference signal and producing an error signal coupled to said reference signal generating means for controlling the frequency and phase of said reference signal;
(f) means responsive to said reference signal for color decoding said separated chrominance component into its color components;
(g) means for generating another reference signal coherent with said luminance component;
(h) means responsive to said other reference signal for color encoding said decoded color components; and
(i) means for combining said luminance component and said color encoded chrominance component into a composite color television signal.

11. For use in a video signal processing system for removing time base errors from video type information signals, an input color processor for modifying input color video signals of the processed color type prior to removal of time base errors therefrom, said input color processor comprising means for separating said incoming processed color video signals into chroma and luminance portions, means for converting said chroma signals into equivalent chroma signals phase locked to a variable frequency input clock reference signal train, said variable frequency input clock reference signal train being coherent with said luminance portion, means for delaying said separated luminance portion by a period equivalent to the delay of said chroma portion of the corresponding line in passing through said converting means, and means for combining said delayed luminance portion with said phase locked equivalent chroma signals, wherein said converting means comprises means including a phase lock loop for generating a color demodulation carrier signal train derived from the burst portion of succeeding lines of incoming color video information, means for demodulating the separated chroma portions into quadrature components with the color demodulation carrier signal train, and means for re-encoding said quadrature color components with said variable frequency input clock reference signal train to generate chroma signals containing the original color information phase locked to said input clock reference signal train.

* * * * *